May 19, 1970     LE ROY W. HOLM     3,512,586
MISCIBLE FLOODING PROCESS USING A SOLUBLE OIL CONTAINING
AN OPTIMUM AMOUNT OF WATER
Filed March 15, 1968
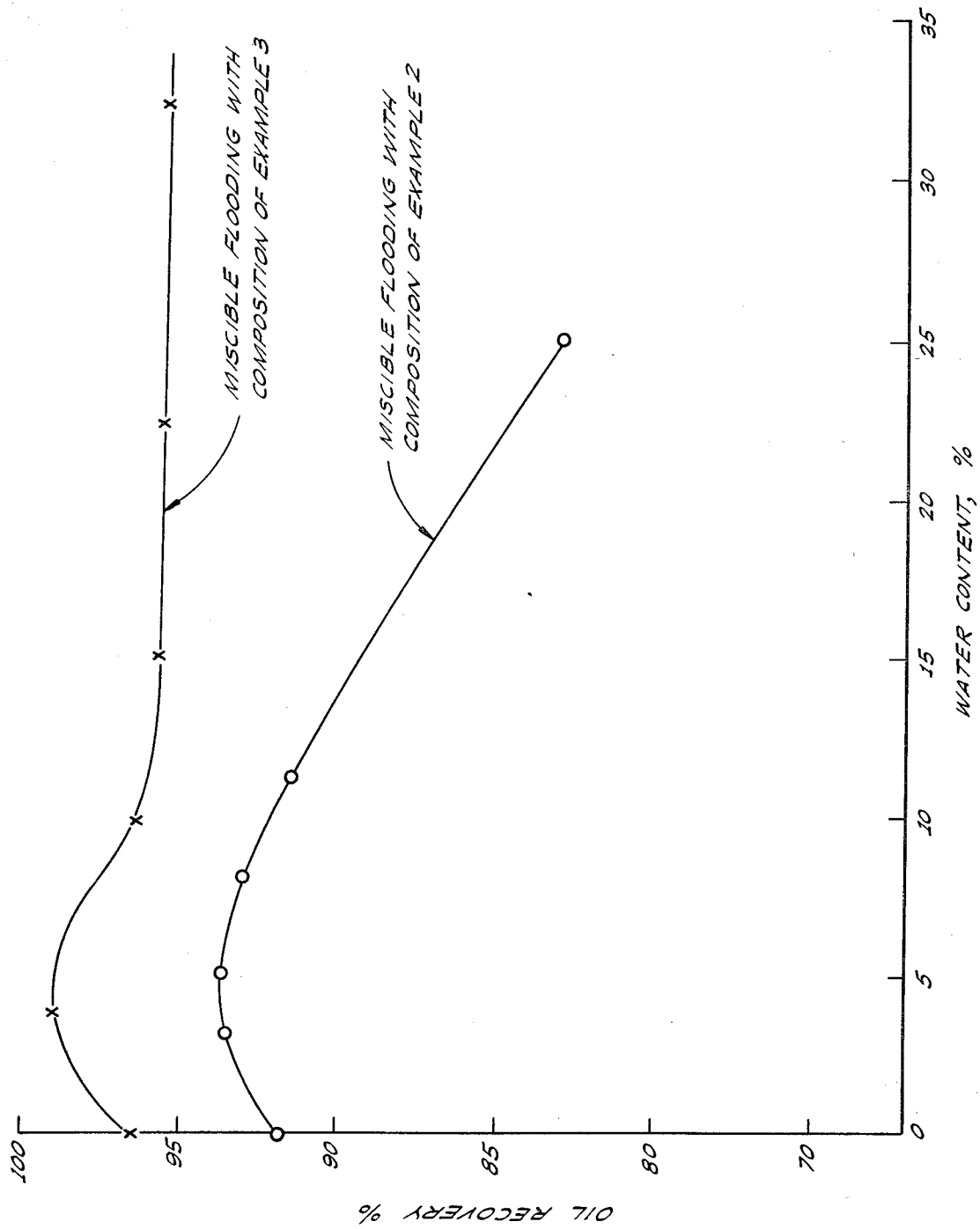
INVENTOR.
LEROY W. HOLM
BY
Dean Sandford
ATTORNEY United States Patent Office 3,512,586
Patented May 19, 1970

3,512,586
MISCIBLE FLOODING PROCESS USING A SOLUBLE OIL CONTAINING AN OPTIMUM AMOUNT OF WATER
Le Roy W. Holm, Fullerton, Calif., assignor to Union Oil Company of California, Los Angeles, Calif., a corporation of California
Filed Mar. 15, 1968, Ser. No. 713,498
Int. Cl. E21b 43/16
U.S. Cl. 166—273    7 Claims

ABSTRACT OF THE DISCLOSURE

A miscible flooding process for the recovery of oil from subterranean reservoirs in which a soluble oil containing an optimum amount of water is injected into the reservoir through an injection well, and thereafter an aqueous flooding agent is injected to drive the miscible displacement fluid towards a spaced production well. Preferred miscible displacement fluids are microemulsions of the water-in-oil type containing an amount of water, between about 1 to 9 percent, that results in the recovery of a maximum amount of oil.

---

This invention relates to the recovery of oil from subterranean petroleum reservoirs, and more particularly to an improved miscible flooding process for the recovery of petroleum.

It has long been recognized that substantial amounts of oil remain unrecovered in the reservoir at the completion of normal primary recovery operations. Hence, various secondary methods of recovering additional quantities of oil have been proposed, such as the well-known technique of water flooding in which water is injected into the reservoir through an injection well to drive additional oil toward one or more production wells spaced apart in the reservoir from the injection well. Although an additional quantity of oil can often be recovered by water flooding, the efficiency of the water flood and the ultimate oil recovery can be further improved by introducing a solvent that is miscible with both the connate oil and with the flood water into the reservoir ahead of the flood water.

One particular solvent system that has been suggested for use with a water drive comprises a mixture of substantially anhydrous soluble oil and an inert, nonaqueous solvent, preferably admixed in such proportions that the viscosity of the mixture approximates the viscosity of the formation oil. The soluble oil consists of a hydrocarbon phase; one or more soaps or non-soap surface active materials; and a stabilizing agent which is usually a monohydric or polyhydric alcohol, or other partially oxygenated, low molecular weight hydrocarbon, such as a ketone. The soluble oil often contains some free organic acid, and especially a fatty acid, such as oleic acid.

It has also been proposed that the flood water be preceded by a microemulsion consisting of a soluble oil containing substantial quantities of water, such as from about 10 to 50 percent or more water. These microemulsions are relatively stable, transparent emulsions of the water-in-oil type, i.e., oil is the continuous phase and extremely small droplets of water are dispersed therein.

While the foregoing anhydrous soluble oils and microemulsions are effective in recovering more oil than recovered by conventional water flooding, it is nevertheless desirable to even further improve the miscible flooding process to reduce its cost and to recover additional amounts of oil.

Accordingly, a principal object of this invention is to provide an improved miscible flooding process for the recovery of petroleum from subterranean reservoirs. Another object of the invention is to provide a miscible flooding process in which an improved miscible displacement fluid is injected into an oil-containing reservoir and thereafter driven through the reservoir by flood water. A further object of the invention is to provide a miscible flooding process employing an improved soluble oil composition as the miscible displaceent fluid. A still further object of the invention is to provide a miscible flooding process utilizing an improved water-in-oil microemulsion as the miscible displacement fluid. Other objects and advantages of the invention will be apparent from the following description.

Briefly, this invention contemplates a process for recovering oil from subterranean reservoirs in which a soluble oil containing an optimum amount of water is injected into the reservoir through an injection well penetrating the reservoir, and thereafter an aqueous flooding agent is injected to drive the water-containing soluble oil towards a production well spaced apart in the reservoir from the injection well. It has been found that maximum oil recovery is obtained in a miscible flooding process by employing as the miscible displacement fluid a soluble oil having a carefully controlled water content. The preferred miscible displacement fluids are microemulsions of the water-in-oil type that contain an amount of water, between about 1 to 9 percent, that results in the recovery of a maximum amount of oil, the exact amount of water depending upon the particular soluble oil system and reservoir conditions.

The figure graphically illustrates ultimate oil recovery, percent of oil-in-place, by miscible flooding with water-containing soluble oils of the present invention.

More specifically, the invention involves a miscible flooding process in which oil is displaced from a subterranean oil-bearing reservoir by a soluble oil containing an optimum amount of water. The preferred water-containing soluble oils are microemulsions of the water-in-oil type miscible with both the connate reservoir oil and with water. In the practice of the invention, a slug of microemulsion is injected into the reservoir through one or more injection or input wells penetrating the oil-bearing formation and forced through the reservoir by subsequently injected flood water toward at least one production or output well similarly completed in the formation. As the miscible flooding medium passes through the reservoir, it displaces residual oil therein and moves it into the producing well whereupon the oil can be recovered by conventional means. The injection and production wells can be arranged in any convenient pattern designed to achieve maximum contact of the oil-bearing zones by the advancing flood front, such as the conventional "five-spot" pattern wherein a central producing well is surrounded by four somewhat symmetrically located injection wells. Another of the conventional flooding patterns that can be employed in the practice of this invention is the "line drive" pattern in which the injection wells are arranged in a line so that the injected flooding medium advances through the formation to displace oil toward one or more spaced production wells that can also be arranged in a line substantially parallel to the line of injection wells.

The soluble oils used herein are oleaginous compositions which have the ability to spontaneously emulsify with water when admixed therewith. These soluble oils generally comprise a liquid hydrocarbon, one or more selected surface active agents and, optionally a stabilizing agent. The emulsions formed by the addition of water to a soluble oil are of the water-in-oil type in that, at water concentrations less than the inversion concentration, oil is the continuous phase and the water is dispersed in the oil in the form of very fine droplets, or micelles, which are less than about 0.1 micron in size, and usually range in size from about 100 to 600 A. These emulsions are generally transparent in appearance, and are stable in that they remain as microemulsions on aging. By transparent, it is meant that the microemulsions do not have a cloudy or opaque appearance, even though they may contain color bodies. It is recognized, of course, that some cloudiness may appear at certain water concentrations without adversely effecting the utility of the microemulsion as a miscible displacement agent. Emulsions of this type are designated microemulsions to distinguish them from ordinary water-in-oil macroemulsions in which the lower limit in the size of the water droplets is about 0.1 micron. At water concentrations above the inversion concentration, the emulsion inverts to an emulsion of the oil-in-water type in which droplets of oil are dispersed in a continuous water phase. In most soluble oil-water systems, the optimum water concentrations employed in the practice of this invention are substantially below the inversion concentration.

One of the major constituents of the soluble oil composition useful in the practice of this invention is a liquid hydrocarbon, which can comprise a crude petroleum oil, such as a crude oil previously recovered from the reservoir, or other conveniently available crude oil; a refined or semi-refined petroleum product, such as gasoline, naphtha, stove oil and diesel; a residual product obtained by the distillation of lower boiling fractions from a crude oil, such as bunker fuel oil and other residual products; a low value refinery by-product, such as catalytic cycle oil, lube oil extract, and the like; and liquefied normally gaseous hydrocarbons, such as propane, butane and LPG. While soluble oils can be prepared from any of these hydrocarbons, or mixtures of different hydrocarbons, in many miscible flooding operations it is preferred to use a soluble oil compounded with petroleum crude oil, such as crude oil previously recovered from the reservoir, or with other conveniently available crude oil.

Surface active materials which can be used are those that when admixed with the liquid hydrocarbon cause the information of microemulsions of the water-in-oil type on the subsequent addition of water. Agents which exhibit this property can be defined by their hydrophilic-lipophilic balance and by their spreading coefficients. The hydrophilic-lipophilic balance is an indication of the size and strength of the hydrophilic, or water-loving, or polar groups, and the lipophilic, or oil-loving, or non-polar, groups in a surfactant material expressed by a numerical value designated HLB number. The spreading coefficient is an indication of the facility with which one liquid spreads upon another liquid. Spreading coefficients greater than 0 indicate that the first liquid will spread on the second, and coefficients less than 0 indicate that the supernatant liquid will simply form floating lenslike drops. Accordingly, surface active materials, or mixtures of materials possessing the ability to spontaneously emulsify water in oil exhibit average HLB numbers of about 3 to 7, and the most negative spreading coefficient consistent with the system.

A number of surface active materials that exhibit the ability to spontaneously emulsify oil and water to produce water-in-oil microemulsions are commercially available. Among the preferred agents are various preferentially oil-soluble anionic surfactants such as the higher alkyl aryl sulfonates, particularly the alkyl naphthenic monosulfonates. A particularly preferred surface active agent is an alkyl aryl monosulfonate prepared by sulfonation of an aromatic petroleum fraction. These sulfonates are preferably in the form of their sodium salts, however, other salts can be used.

It has been found that superior soluble oil compositions can be prepared by employing as the surface active agent a combination of preferentially oil-soluble organic sulfonates and preferentially water soluble organic sulfonates.

The preferentially oil-soluble surfactant material is an oil-soluble, relatively water-insoluble organic sulfonate that exhibits substantially greater solubility in oil than in water. Some of the preferentially oil-soluble organic sulfonates useful in the practice of this invention are almost completely insoluble in water, while others exhibit limited water solubility, particularly at elevated temperatures. Even though the preferentially oil-soluble or organic sulfonates may exhibit some water solubility, they are nevertheless characterized by markedly greater solubility in oil. The preferentially water-soluble surfactant material is a water-soluble, relatively oil-insoluble organic sulfonate that exhibits substantially greater solubility in water than in oil. Some of these preferentially water-soluble organic sulfonates are almost completely insoluble in oil, while others exhibit limited oil solubility, particularly at elevated temperatures. Even though the preferenttially water-soluble organic sulfonates may exhibit some oil solubility, they are nevertheless characterized by markedly greater solubility in water.

One class of preferentially oil-soluble organic sulfonates particularly useful in the practice of this invention are oil-soluble alkyl aryl sulfonates that contain only one sulfonic group attached to an alkyl aryl hydrocarbon. The preferentially oil-soluble alkyl aryl sulfonates are those which in the form of their sodium salts have molecular weights of more than about 400. Among the preferred preferentially oil-soluble organic sulfonates are alkyl sodium benzene sulfonates and alkyl sodium polyaryl sulfonates having molecular weights of more than about 400. The preferred preferentially water-soluble organic sulfonates include water-soluble alkyl aryl sulfonates. The water-soluble alkyl aryl sulfonates are generally those which in the form of their sodium salts have molecular weights of less than about 400 or which contain more than one sulfonic acid group per molecule. It has been found that in soluble oils compounded from petroleum crude oil or other high boiling hydrocarbons, superior results are obtained by employing as the preferentially oil-soluble organic sulfonate an alkyl aryl sulfonate which in the form of its sodium salt has a molecular weight above about 450, and preferably in the range of about 450 to 550.

Thus, the soluble oil compositions of this invention are prepared by admixing into the hydrocarbon a preferentially oil-soluble organic sulfonate, such as an alkyl aryl sulfonate or mixture of sulfonates which in the form of their sodium salts have molecular weights of more than about 400, and a preferentially water-soluble organic sulfonate, such as an alkyl aryl sulfonate or mixture of sulfonates which in the form of their sodium salts have molecular weights of less than about 400 or which are polysulfonates. Alternatively, a mixture of preferentially water-soluble and preferentially oil-soluble sulfonates can be employed, such as a mixture of alkyl aryl sulfonates which in the form of the sodium salt have an average molecular weight in the range of about 400 to 500.

The preferentially oil-soluble alkyl aryl sulfonates and preferentially water-soluble alkyl aryl sulfonates useful in the practice of this invention can be prepared by sulfonating an appropriate alkyl aryl hydrocarbon or mixture of hydrocarbons. Thus, a preferred preferentially oil-soluble alkyl aryl sulfonate can be prepared by sulfonating an alkyl aryl hydrocarbon to yield an alkyl aryl sulfonate which in the form of its sodium salt has a molecular weight of more than about 400. The preferred preferentially water-soluble alkyl aryl sulfonates are prepared by selecting the alkyl aryl hydrocarbon so that when sulfonated, the resulting alkyl aryl sulfonate in the form of its sodium salt has a molecular weight of less than about 400, or by sulfonating sufficiently to form the polysulfonates. These sulfonates are preferably in the form of the sodium salt, however other salts can be used.

A readily available source of alkyl aryl sulfonates are the natural petroleum sulfonates produced by sulfonating a relatively narrow boiling range mixture of petroleum hydrocarbons. Depending upon the boiling range of the hydrocarbon fraction, on sulfonation mixtures of alkyl aryl monosulfonates are produced which may be either preferentially water-soluble or preferentially oil-soluble. The term "petroleum sulfontes" is a commercial designation of sulfonates which are obtained by a treatment of petroleum fractions, particularly solvent treated aromatic fractions, with sulfuric acid, fuming sulfuric acid or sulfur trioxide. Upon sulfonation, two types of general products are formed which are designated mahogany acid sulfonates and green acid sulfonates. The terminology is based on the colors imparted to the sulfonates in solution, a brownish color being imparted to the sulfonates which remain in the oil and the greenish color imparted to aqueous solutions made from the acid sludges formed in the sulfonation process. The mahogany sulfonates are preferentially oil-soluble and the green sulfonates are preferentially water-soluble.

The mahogany sulfonates are alkyl aryl sulfonates which usually contain only one sulfonic group per molecule and both the green and the mahogany types contain mixtures of sulfonates of varying molecular weights with the mahogany, or oil-soluble sulfonates generally containing the sulfonates of higher molecular weights. The green sulfonates, or water-soluble sulfonates, contain the sulfonates of lower molecular weight or those containing more than one sulfonate group per molecule.

The preferentially oil-soluble surface active material and the preferentially water-soluble surface active material are employed in the proportions of about 1 part of prefentially oil-soluble agent per part of water-soluble agent to about 12 parts of oil-soluble agent per part of water soluble agent. Although the optimum surfactant combination is dependent upon the characteristics, of the particular reservoir, in many operations it is found the superior results are obtained with a surfactant combination containing about 1 to 4 parts of preferentially oil-soluble surface active material per part of preferentially water-soluble surface active material; and more particularly, with a surfactant mixture containing about 2 parts of preferentially oil-soluble agent per part of preferentially water-soluble agent.

The various stabilizing agents that are admixed with the soluble oil to improve the properties and stability of the resulting microemulsions formed by admixing the soluble oil with water include partially oxygenated organic liquids such as monohydric and polyhydric alcohols, ketones, ethers and polyhydric alkyl ethers. Specific agents found particularly useful include isopropyl alcohol, secondary butyl alcohol, methyl ethyl ketone, glycol monoethyl ether (Cellosolve), glycol monobutyl ether (butyl Cellosolve), and diethylene glycol monobutyl ether (butyl Carbitol). It has been found that increased quantities of oil can be recovered from a subterranean petroleum reservoir by a miscible flooding process utilizing a water-in-oil microemulsion containing an optimum amount of water than can be recovered by miscible flooding with an anhydrous soluble oil or with microemulsions containing more than the optimum amount of water. By optimum amount of water is meant that water content of the soluble oil which results in the recovery of a maximum amount of oil. The optimum water content will depend upon the particular soluble oil system and the reservoir conditions, and can be determined by simple oil recovery tests on actual or simulated core samples. For most operations, it has been found that increased oil recoveries are obtained with water-in-oil micro emulsions containing from 1 to 9 volume percent water, and more particularly from about 2 to 7 volume water. With many systems, the optimum water content is from about 4.5 to 6.5 volume percent water. Thus, increased oil recoveries are obtainable by flooding the reservoir with a slug of water-in-oil microemulsion containing about 5 percent water, and thereafter displacing the microemulsion through the formation with an aqueous medium. The quantity of microemulsion injected should be sufficient to establish in the reservoir a miscible bank which can be displaced through the reservoir by the subsequently injected aqueous flooding medium. Satisfactory oil recoveries can usually be obtained by the injection of 0.01 to 0.15 reservoir pore volume of microemulsion.

The microemulsions useful in the practice of this invention can be prepared by any of the conventional techniques. One suitable method is to prepare a substantially anhydrous soluble oil by admixing the hydrocarbon base stock and the surface active material. Also, one or more of the foregoing stabilizing agents can optionally be added to the soluble oil. Thereafter water is added to the soluble oil to form a water-in-oil microemulsion containing an optimum amount of water. Preferably, the water employed in forming the microemulsion is a salt-containing fresh water having a disolved salt content of less than about 5000 p.p.m.

Thus, in a preferred embodiment of this invention, a liquid hydrocarbon, such as previously recovered reservoir oil; a surface active agent, such as a mixed alkyl aryl petroleum sulfonate; and a stabilizing agent, such as isopropyl alcohol or a glycol alkyl ether are admixed to obtain a substantially anhydrous soluble oil comprised of 62 to 87 percent hydrocarbon, 8 to 30 percent surface active material and 3 to 8 percent of a partially oxygenated organic liquid stabilizing agent. Thereafter water is added to the soluble oil to obtain a microemulsion having an optimum water content of about 1 to 9 percent. Also, where the liquid hydrocarbon has a relatively high viscosity, an additional quantity of low viscosity, light liquid hydrocarbon can be added to increase the mobility of the resulting microemulsion to obtain a more favorable mobility ratio between the microemulsion and the following drive fluid. The light liquid hydrocarbon will usually not constitute more than 25 percent by volume of the microemulsion.

The microemulsion prepared in the foregoing manner is then injected into the reservoir through one or more injection wells in an amount equivalent to 0.01 to 0.15 pore volume of the reservoir to be treated. Aqueous flooding medium is then injected to displace the microemulsion toward at least one production well spaced apart in the reservoir, from which fluids are produced in conventional manner. The aqueous flooding medium can comprise water or brine, and can be made more viscous by the addition of a thickening agent, such as sugar, dextran, carboxymethyl cellulose, amines, glycerine, guar gum and mixtures of these agents. Also, the aqueous flooding medium can be rendered viscous by the addition of a small amount of water-soluble polymer, such as a polyacrylamide, and particularly a partially hydrolized polyacrylamide. In a preferred method of practicing this invention, thickening agent is added to only an initial portion of the flood water. Thus, in this preferred embodiment, 0.01 to 0.15 reservoir pore volume of soluble oil is injected into the reservoir and followed by 0.1 to 0.5 reservoir pore volume of thickened aqueous flooding medium. Thereafter, water or brine is injected to drive the previously injected fluids toward at least one spaced production well.

The invention is further illustrated by the following examples which are illustrative of specific modes of practicing the invention and are not intended as limiting the scope of the invention as defined by the appended claims.

EXAMPLE 1

The increased oil recovery obtainable by miscible flooding with a microemulsion containing an optimum amount of water is demonstrated by the following laboratory tests. Two substantially identical test cores 2 feet long by 1½ inches in diameter are prepared by packing Lucite tubes with Nevada 130 sand. The cores are first saturated with brine and then with an Illinois crude having a gravity of 39° API. Final oil saturation is about 81 percent.

A substantially anhydrous soluble oil is prepared by admixing 72.0 percent of the Illinois crude, 6.7 percent isopropyl alcohol and 21.3 percent of a mixed alkyl aryl petroleum sulfonate marketed by the Sonneborn Division of the Witco Chemical Company, Inc. under the trademark Petronate CR. Petronate CR is an oil solution containing about 62 percent of alkyl aryl sodium sulfonates having a molecular weight in the range of 490-510 and about 5 percent water.

The first test is conducted by flooding one of the cores with 0.14 pore volume of a microemulsion prepared from a portion of the soluble oil mixture by adding 39.3 percent tap water containing about 700 p.p.m. dissolved salts thereto. The microemulsion is driven through the core with an aqueous flooding medium thickened by the addition of 0.1 weight percent of a partially hydrolyzed polyacrylamide marketed by the Dow Chemical Company under the trademark Pusher 500. The recovered oil is accumulated and the volume of oil recovered is measured. The ultimate recovery after the injection of 1.28 pore volumes of aqueous flooding medium is 83.4 percent of the original oil-in-place exclusive of the amount of soluble oil injected.

The foregoing test is repeated on the second core using 0.1 pore volume of a microemulsion prepared by adding 3.0 percent tap water to a portion of the soluble oil mixture. The ultimate oil recovery after injection of 1.21 pore volumes of aqueous flooding medium is 86.6 percent of the original oil-in-place exclusive of the amount of soluble oil injected.

EXAMPLE 2

The effect of the water content of a microemulsion employed as a miscible displacement fluid in oil recovery is demonstrated by the following tests. A number of substantially identical 2 feet by 1½ inch diameter test cores are prepared by packing Lucite tubes with Nevada 130 sand. The cores are then saturated with brine and then with an Illinois crude having a gravity of 39° API. Final oil saturation is about 80-84 percent.

A substantially anhydrous soluble oil is prepared by admixing 72.0 percent of the Illinois crude, 6.7 percent butyl Cellosolve and 21.3 percent of a mixed alkyl aryl petroleum sulfonate marketed by the Sonneborn Division of the Witco Chemical Company, Inc. under the trademark Petronate CR.

The cores are flooded with 0.1 pore volume of the anhydrous soluble oil and with microemulsions prepared by adding various amounts of tap water to the anhydrous soluble oil. The microemulsion slugs are driven through the cores with an aqueous 0.06 weight percent solution of partially hydrolyzed polyacrylamide marketed by the Dow Chemical Company under the trademark Pusher 500. The recovered oil is accumulated and the volume of oil recovered is measured. The results of these tests are summarized in Table 1 and graphically illustrated in the drawing.

TABLE 1

| Run Number: | Water content microemulsion, volume percent | Original oil saturation, percent | Driving fluid injected, pore volumes | Ultimate oil recovery, percent of oil-in-place |
| --- | --- | --- | --- | --- |
| 1 | 0 | 84 | 1.07 | 91.8 |
| 2 | 3.2 | 80 | 1.18 | 93.5 |
| 3 | 5.1 | 81 | 1.23 | 93.6 |
| 4 | 8.1 | 81 | 1.27 | 93.0 |
| 5 | 11.3 | 81 | 1.25 | 91.3 |
| 6 | 25.1 | 82.5 | 2.0 | 82.9 |

EXAMPLE 3

The tests of Example 2 are repeated using a soluble oil prepared by admixing 72.0 percent petroleum naphtha, 19.2 percent mixed alkyl aryl petroleum sulfonate marketed by the Sonneborn Division of Witco Chemical Company, Inc. under the trademark Petronate HL, and 8.8 percent isopropyl alcohol. Petronate HL is an oil solution containing about 52 percent of alkyl aryl sodium sulfonates having a molecular weight in the range of 440 to 470. The results of these tests are reported in Table 2. In all runs the core is initially saturated with 81-82 percent of 39° API Illinois crude.

TABLE 2

| Run Number: | Water content of microemulsion, volume percent | Driving fluid injected, pore volumes | Ultimate oil recovery, percent of oil-in-place |
| --- | --- | --- | --- |
| 1 | 0 | 1.3 | 96.5 |
| 2 | 3.9 | 1.3 | 99.0 |
| 3 | 9.9 | 1.3 | 96.3 |
| 4 | 15.1 | 1.3 | 95.6 |
| 5 | 22.4 | 1.3 | 95.5 |
| 6 | 32.4 | 1.3 | 95.3 |

These data are graphically illustrated in the drawing.

EXAMPLE 4

A miscible flooding operation is conducted on an oil-containing reservoir in accordance with the method of this invention. Four injection wells are arranged in a rectangular pattern around a single centrally located production well. A miscible displacement fluid comprising a microemulsion containing about 68.4 percent crude oil previously recovered from the reservoir, 6.4 percent butyl Cellosolve, 20.2 percent mixed alkyl aryl petroleum sulfonates and 5.0 percent fresh water containing about 900 p.p.m. dissolved salts. The microemulsion is injected through each of four injection wells at injection rates of 30-40 barrels per day until a total amount of microemulsion equivalent to about 0.05 pore volume is injected. Thereafter, aqueous flooding medium is injected into the reservoir through each of the injection wells and petroleum and other produced fluids are recovered from the central producing well.

Various embodiments and modifications of this invention have been described in the foregoing description and examples, and further modifications will be apparent to those skilled in the art. Such modifications are included within the scope of this invention as defined by the following claims.

Having now described the invention, I claim:

1. In the method of recovering petroleum from a subterranean reservoir in which a miscible displacement fluid miscible with both the connate reservoir oil and with water is injected into the reservoir through an injection well, and thereafter an aqueous flooding medium is injected to drive the miscible displacement fluid towards a spaced production well from which fluids are recovered, the improvement which comprises employing as the miscible displacement fluid a soluble oil containing an amount of water between about 1 to 9 volume percent selected to result in the recovery of a maximum amount of said reservoir oil.

2. The method defined in claim 1 wherein between about 0.01 to 0.15 reservoir pore volume of said miscible displacement fluid is injected into the reservoir.

3. The method defined in claim 1 wherein at least an initial portion of said aqueous medium is increased in viscosity by the addition of a thickening agent.

4. A method for recovering petroleum from a subterranean reservoir penetrated by an injection well and a recovery well spaced apart in the reservoir, which comprises:

injecting 0.01 to 0.15 reservoir pore volume of a soluble oil comprising a water-in-oil microemulsion containing liquid hydrocarbon, a surface active material, a partially oxygenated organic liquid stabilizing agent, and an amount of water between about 1 to 9 volume percent selected to result in the recovery of a maximum amount of oil;

thereafter injecting an aqueous flooding medium to drive the soluble oil towards said production well; and recovering petroleum from said production well.

5. The method defined in claim 4 in which an initial portion of the aqueous flooding medium is increased in viscosity by the addition of a small amount of a water-soluble polymer.

6. The method defined in claim 4 wherein said microemulsion comprises about 62 to 87 volume percent liquid hydrocarbon, 8 to 30 volume percent of a surface active material, 3 to 8 volume percent of a partially oxygenated organic liquid stabilizing agent, and between about 1 to 9 volume percent water.

7. A method for recovering petroleum from a subterranean reservoir penetrated by an injection well and a recovery well spaced apart in the reservoir, which comprises:

injecting 0.01 to 0.15 reservoir pore volume of a soluble oil comprising a water-in-oil microemulsion containing about 62 to 87 volume percent petroleum crude oil; 8 to 30 volume percent of surface active alkyl aryl sodium sulfonates; 3 to 8 volume percent of a partially oxygenated organic liquid, and an amount of the water between about 1 to 9 volume percent selected to result in the recovery of a maximum amount of oil;

next injecting 0.1 to 0.5 reservoir pore volume of an aqueous flooding medium thickened by the addition of a minor proportion of a water-soluble polymer;

thereafter injecting a flood water to displace said previously injected fluids towards said production well; and recovering petroleum from said production well.

References Cited

UNITED STATES PATENTS

| | | | |
|---|---|---|---|
| 3,163,214 | 12/1964 | Csaszar | 166—9 |
| 3,261,399 | 7/1966 | Coppel | 166—9 |
| 3,275,075 | 9/1966 | Gogarty et al. | 166—9 |
| 3,307,628 | 3/1967 | Sena | 166—9 |
| 3,324,955 | 6/1967 | Poettmann | 166—9 |
| 3,348,611 | 10/1967 | Reisberg | 166—9 |
| 3,406,754 | 10/1968 | Gogarty | 166—9 |
| 3,412,791 | 11/1968 | Gogarty | 166—9 |

STEPHEN J. NOVOSAD, Primary Examiner

U.S. Cl. X.R.

166—274

UNITED STATES PATENT OFFICE
CERTIFICATE OF CORRECTION

Patent No. 3,512,586          Dated May 19, 1970

Inventor(s)  Le Roy W. Holm

It is certified that error appears in the above-identified patent and that said Letters Patent are hereby corrected as shown below:

Under References Cited, column 10,

Patent No. 3,324,955 should be 3,324,944

SIGNED AND
SEALED
SEP 15 1970

(SEAL)
Attest:

Edward M. Fletcher, Jr.
Attesting Officer

WILLIAM E. SCHUYLER, JR.
Commissioner of Patents